(12) United States Patent
Elter et al.

(10) Patent No.: US 12,497,059 B2
(45) Date of Patent: Dec. 16, 2025

(54) METHOD FOR CARRYING OUT CONTROL PROCEDURES IN A VEHICLE

(71) Applicant: Robert Bosch GmbH, Stuttgart (DE)

(72) Inventors: Stephan Elter, Weinsberg (DE);
Fabiola Maget, Ludwigsburg (DE);
Steffen Haeberle, Lauffen am Neckar (DE)

(73) Assignee: ROBERT BOSCH GMBH, Stuttgart (DE)

( * ) Notice: Subject to any disclaimer, the term of this patent is extended or adjusted under 35 U.S.C. 154(b) by 210 days.

(21) Appl. No.: 18/002,327

(22) PCT Filed: Sep. 20, 2021

(86) PCT No.: PCT/EP2021/075803
§ 371 (c)(1),
(2) Date: Dec. 19, 2022

(87) PCT Pub. No.: WO2022/096187
PCT Pub. Date: May 12, 2022

(65) Prior Publication Data
US 2023/0347917 A1    Nov. 2, 2023

(30) Foreign Application Priority Data

Nov. 4, 2020   (DE) .................... 10 2020 213 857.5

(51) Int. Cl.
*B60W 50/08*    (2020.01)
*B60W 30/02*    (2012.01)
(Continued)

(52) U.S. Cl.
CPC .......... *B60W 50/085* (2013.01); *B60W 30/02* (2013.01); *B60W 50/045* (2013.01);
(Continued)

(58) Field of Classification Search
CPC .. B60W 50/085; B60W 30/02; B60W 50/045; B60W 40/10; B60W 2050/0022;
(Continued)

(56) References Cited

U.S. PATENT DOCUMENTS

2005/0222717 A1   10/2005   Erban et al.
2012/0130616 A1*   5/2012   Caspari ........... B60W 30/18172
                                                                701/70
(Continued)

FOREIGN PATENT DOCUMENTS

DE         10359216 A1    2/2005
DE    102009024036 A1   12/2010
(Continued)

OTHER PUBLICATIONS

International Search Report for PCT/EP2021/075803, Issued Dec. 9, 2021.

*Primary Examiner* — Navid Z. Mehdizadeh
*Assistant Examiner* — Micah Chuen-Him Cheng
(74) *Attorney, Agent, or Firm* — NORTON ROSE FULBRIGHT US LLP

(57) ABSTRACT

In a method for carrying out control procedures in a vehicle, a criticality indicator is calculated from various stability indicators. The criticality indicator is fed to at least two different controllers or at least two different sub-controllers of a controller of the vehicle in order for controller parameters to be established.

11 Claims, 2 Drawing Sheets

(51) Int. Cl.
  *B60W 40/10* (2012.01)
  *B60W 50/00* (2006.01)
  *B60W 50/04* (2006.01)

(52) U.S. Cl.
  CPC ..... *B60W 40/10* (2013.01); *B60W 2050/0022* (2013.01); *B60W 2540/00* (2013.01)

(58) Field of Classification Search
  CPC ..... B60W 2540/00; B60W 2050/0012; B60W 2050/0008; B60W 2050/0088; B60W 50/08; B60W 40/12; B60T 8/174; B60T 2270/86; B60T 8/1755
  See application file for complete search history.

(56) References Cited

U.S. PATENT DOCUMENTS

| | | | | |
|---|---|---|---|---|
| 2014/0350789 | A1* | 11/2014 | Anker | B62D 15/025 |
| | | | | 701/41 |
| 2020/0247393 | A1* | 8/2020 | Danford | G05D 1/0088 |
| 2022/0032965 | A1* | 2/2022 | Feifel | B60W 30/095 |

FOREIGN PATENT DOCUMENTS

| | | | |
|---|---|---|---|
| EP | 638742 | A1 | 2/1995 |
| JP | 2016068935 | A | 5/2016 |
| JP | 2018173816 | A | 11/2018 |
| JP | 2020093584 | A | 6/2020 |

* cited by examiner

METHOD FOR CARRYING OUT CONTROL PROCEDURES IN A VEHICLE

FIELD

The present invention relates to a method for carrying out control procedures in a vehicle.

BACKGROUND INFORMATION

A wide variety of control systems are available in vehicles comprising controllers in the brake system, in the steering system, in the drive system and in the chassis. Examples include traction control systems (ASR) and electronic stability programs (ESP), which can be used to influence the longitudinal dynamics and the lateral dynamics of the vehicle. The various controllers in the vehicle have to be parameterized depending on the vehicle. If applicable, the control thresholds of the controllers can be dynamically adapted to the current driving situation.

SUMMARY

A method according to the present invention may efficiently enable the implementation of control procedures in a vehicle. The control procedures relate to controls which are carried out with the aid of at least two different controllers and/or at least two different sub-controllers of a controller ($R_i$) in the vehicle on the basis of current state and/or surroundings variables of the vehicle. The controllers are controllers which are advantageously able to influence the vehicle driving dynamics, in particular the longitudinal dynamics and/or the lateral dynamics of the vehicle. Suitable controllers include, for example, an ESP controller, an ASR traction control system or the like.

Various controller functions or controller tasks of a controller are suitable as sub-controllers implemented in a common controller. For example, a first sub-controller can include an open-loop pilot control function and a second and possibly further sub-controllers of the same controller can include closed-loop feedback control or controller feedback. A first sub-controller can work preventively, for example, and change the driving behavior of the vehicle without controller feedback, whereas a second and possibly further sub-controllers of the same controller with controller feedback have a stabilizing effect on the driving behavior. For model-based controls, the sub-controllers also include model influences that are set via the pilot control.

With the aid of the method according to an example embodiment of the present invention, at least two different stability indicators are determined from current state and/or surroundings variables of the vehicle. For each stability indicator, each of which is implemented as a scalar or vector variable, different state or surroundings variables of the vehicle are used. It may be expedient to use some of the same state and surroundings variables for the various indicators, but at least one surroundings or state variable in the various stability indicators must be different.

According to a predefined calculation rule, a criticality indicator, which is likewise implemented as a scalar or optionally as a vector variable, is calculated from the various stability indicators. The criticality indicator is used in at least two different controllers or sub-controllers of the vehicle to determine and set controller parameters.

This procedure may have the advantage that various controllers or sub-controllers in the vehicle can be parameterized with only one value, the criticality indicator, wherein the current driving situation in terms of the current state variables and the current surroundings variables of the vehicle is taken into account via the stability indicators. A defined set of controller parameters is assigned to each value of the criticality indicator in the various controllers or sub-controllers. It is thus possible to continuously parameterize all of the involved controllers or sub-controllers with current values on the basis of the current surroundings and driving situation.

The permitted intervention intensity of a controller or sub-controller can be continuously adjusted via the criticality indicator, for example. This makes it possible, for example, to allow an agility intervention to increase sporty driving behavior if this is permitted based on the level of the criticality indicator. This also improves driver acceptance of controller intervention because the level of the criticality indicator correlates with how the driver subjectively feels in a current driving situation.

According to one advantageous embodiment of the present invention, the stability indicators include lateral dynamic state variables and longitudinal dynamic state variables. State variables relating to position, speed and/or acceleration in the longitudinal direction and in the lateral direction of the vehicle are taken into account here. The state variables considered are, for example, the longitudinal speed, the wheel slip on one or more vehicle wheels, the vehicle lateral acceleration, the slip angle, the steering angle and the like. The accelerator pedal position and/or the brake pedal position can furthermore be taken into account as well. The road friction coefficient in particular is taken into account as surroundings variables. An energy consideration, which is reflected in a stability indicator, is possible too, wherein the energy consideration relates the conversion of translational energy into rotational energy to the maximum possible energy potential. The driver behavior can be taken into account as a surroundings variable as well, for example in addition to the abovementioned accelerator pedal and brake pedal position, also the steering wheel position or other driver-specific variables, for instance the driver's activity state, which can be derived from the driver actuations or determined via an observation sensor system in the vehicle interior.

According to yet another advantageous embodiment of the present invention, the calculation rule for determining the criticality indicator includes carrying out a weighting of the various stability indicators. This procedure allows the individual stability indicators to have varying degrees of influence on the criticality indicator.

The calculation rule can comprise a fuzzy logic or can be based on artificial intelligence, in particular for weighting the various stability indicators.

According to a further advantageous embodiment of the present invention, at least one stability indicator can be used to limit the criticality indicator. For example, it is possible to define a yaw rate indicator as a stability indicator that is entirely or significantly dependent on the yaw rate. This yaw rate stability indicator can be used to limit a criticality indicator previously determined from other stability indicators.

It is also possible to use one or more stability indicators that are associated with only a partial range of values of the criticality indicator for a respective limitation of the criticality indicator. This pertains to a stability indicator that is dependent on driver behavior, a wheel slip stability indicator, a stability indicator related to the yaw acceleration, for example, and/or a stability indicator related to the longitudinal speed. On the one hand, these stability indicators and, if applicable, alternative or additional stability indicators can substantially determine a partial range of values of the criticality indicator and, on the other hand, lead to an upward or downward limitation of the criticality indicator.

The assignment of a stability indicator to a specific value range of the criticality indicator relates, for example, only to the subrange between 0% and 50% or only to the subrange between 50% and 100% of the criticality indicator. The stability indicators are scaled accordingly. The sought criticality indicator can be determined from the resulting indicators by following further calculation rules, for example via fuzzy logic or artificial intelligence.

According to a further advantageous embodiment of the present invention, it is provided that one or more controllers or sub-controllers, possibly all controllers or sub-controllers, are activated only if the criticality indicator exceeds an activation threshold. If the value of the criticality indicator is relatively low, the vehicle is currently in a non-critical situation that does not require intervention of one, multiple or all of the controllers or sub-controllers. It may be expedient to deactivate only a subset of the existing controllers or sub-controllers and to activate the remaining controllers or sub-controllers. The activation threshold can be fixed or adjusted dynamically. It is also possible to provide different activation thresholds for various controllers or sub-controllers. Some or all of these can accordingly be fixed or adjusted dynamically.

With the aid of the method according to the present invention, it is possible, on the basis of the criticality indicator, to activate the various controllers using this criticality indicator simultaneously. It is also possible for various controllers or sub-controllers to be activated at different times. The start and/or end time of the activity phase of a controller or sub-controller can be both within and outside the activity phase of another controller.

The present invention also relates to a control unit comprising means for carrying out the above-described method. The means include at least one memory unit, at least one computing unit, a control unit input and a control unit output in the control unit. It is furthermore possible that a control unit network is provided, which comprises a plurality of individual control units, wherein each of the control units is configured in the above-described manner. The individual control units can respectively be assigned to a controller or sub-controller.

The present invention also relates to a control system in a vehicle, which comprises at least two individual, differing controllers or sub-controllers, as well as a previously described control unit or a previously described control unit network.

The present invention further relates to a vehicle comprising a previously described control system, for example a motor vehicle or a motorized single-track vehicle.

The present invention also relates to a computer program product comprising a program code which is designed to carry out the above-described method steps. The computer program product runs in a previously described control unit or control unit network.

Further advantages and expedient embodiments of the present invention are disclosed herein.

DETAILED DESCRIPTION OF EXAMPLE EMBODIMENTS

Figure 1:
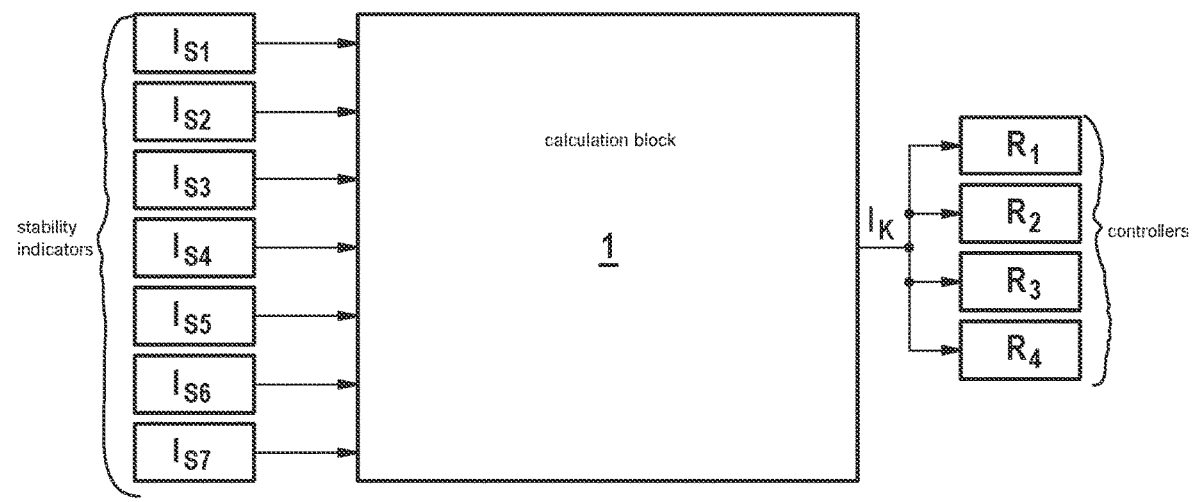
FIG. 1 shows a block diagram with a schematic diagram of the determination of a criticality indicator from various stability indicators determined from a variety of state and surroundings variables of a vehicle, according to an example embodiment of the present invention.

FIG. 1 shows a block diagram for determining a criticality indicator $I_K$ as a function of various stability indicators $I_{s2}$, $I_{s3}$ . . . for situation-dependent parameterization of various controllers $R_1$, $R_2$, $R_3$, $R_4$ in a vehicle. The controllers $R_1$, $R_2$, $R_3$, $R_4$ are either independent controllers and/or sub-controllers of a common controller. The criticality indicator $I_K$ represents a scalar value that reflects the current vehicle situation and is made available to the various controllers $R_i$ in the vehicle. The controllers $R_i$ are preferably stability controllers, in particular for influencing the lateral dynamics of the vehicle, for example an ESP controller, but also one or more controllers for influencing the longitudinal dynamics of the vehicle, such as a traction control system.

The criticality indicator $I_K$ is continuously updated as a function of vehicle state variables and/or surroundings variables of the vehicle and made available to the various controllers. This approach makes it possible to use the criticality indicator $I_K$ to determine only one variable that is used to parameterize the various controllers in the vehicle. Depending on the level of the criticality indicator $I_K$, the controllers can be parameterized in different ways or activated or deactivated above or below an activation threshold value.

The continuous determination of the criticality indicator $I_K$ is carried out as a function of the stability indicators $I_{s1}$, $I_{s2}$, $I_{s3}$ . . . . Each stability indicator $I_s$ depends on a variety of state and/or surroundings variables of the vehicle, wherein the various stability indicators $I_s$ each depend on at least partially different state or surroundings variables. The current stability indicators $I_s$ are determined using sensor information acquired via a sensor system in the vehicle. The various stability indicators $I_s$ are processed in a calculation block 1, in which the criticality indicator $I_K$ is calculated. The criticality indicator $I_K$ can be calculated with the help of fuzzy logic or artificial intelligence.

Figure 2:
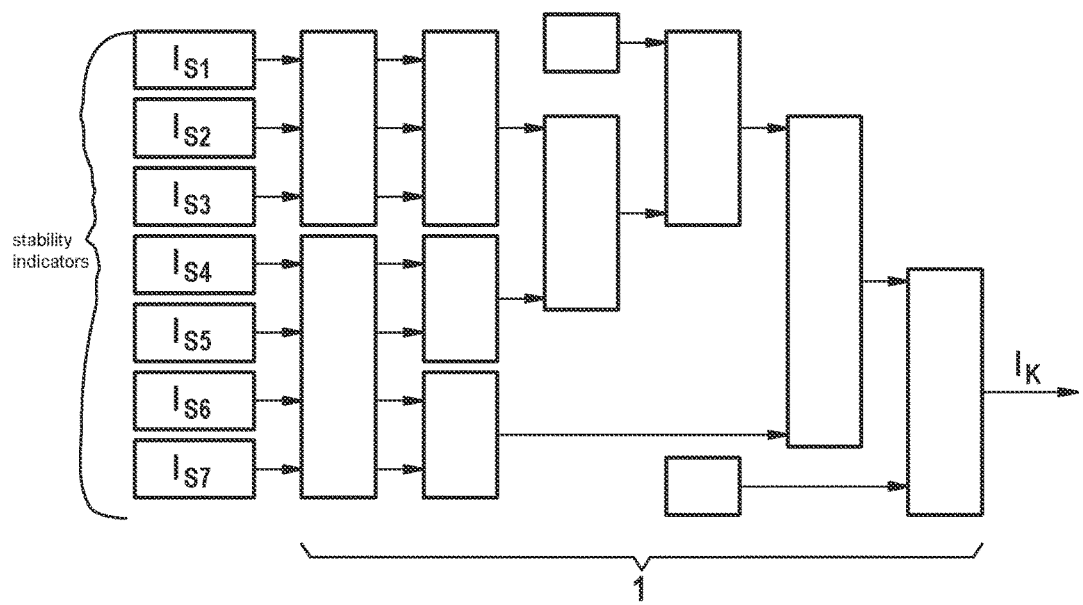
FIG. 2 shows a block diagram with a detailed illustration of the determination of the criticality indicator, according to an example embodiment of the present invention.

FIG. 2 shows a detailed block diagram for determining criticality indicator $I_K$ from the stability indicators $I_s$. The calculation block 1 is divided into various sub-steps. The stability indicators $I_s$ are calculated as stability indicator Isi as a function of an energy consideration with the conversion of translational energy into rotational energy in relation to the maximum possible energy potential, for example. Another stability indicator $I_{s2}$ is determined as a function of the current slip angle, and other stability indicators can be dependent on the lateral acceleration of the vehicle, driver behavior, wheel slip, the longitudinal speed, etc. All stability indicators $I_s$ are continuously determined using current sensor information and made available to the calculation block 1 to calculate a current criticality indicator $I_K$.

The various stability indicators $I_s$ can be processed in the calculation block 1 in different ways. For example, it is possible that some of the stability indicators in the calculation block 1 are first scaled to the full range of values between 0% and 100% of the criticality indicator and then processed further, whereas other stability indicators are scaled to only a partial range of values of the criticality indicator, for example between 0% and 50%, and then processed further. It is also possible to take various other current variables into account; for instance use another stability indicator to limit the criticality indicator, for example a yaw rate stability indicator. The current position in the steering system, in the accelerator pedal and in the brake pedal can respectively be taken into account as further stability indicators as well. Using fuzzy logic and artificial intelligence, the sought criticality indicator $I_K$ which is made available as a scalar variable to the various controllers $R_1$, $R_2$, $R_3$ . . . can be determined taking into account limiting stability indicators.

Figure 3:
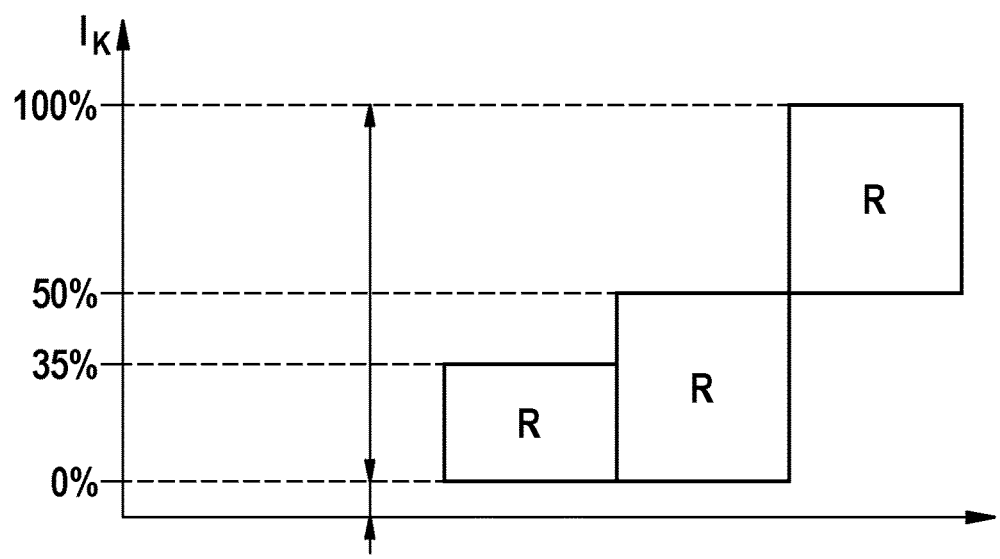
FIG. 3 shows a diagram showing possible controller interventions as a function of the criticality indicator, according to an example embodiment of the present invention.

FIG. 3 shows a diagram in which the activation of various controllers R or sub-controllers in the vehicle is depicted as a function of the criticality indicator $I_K$. The criticality indicator is scaled between 0% and 100%. Below an activation threshold value of 10%, for example, the controllers R remain deactivated. When the activation threshold value for a value range of the criticality indicator $I_K$ in the value range between 10% and 100% is exceeded, activation of the controller R is possible, wherein a stronger controller intervention is required as the criticality indicator $I_K$ increases. A strong controller intervention, as is shown as an example in the right upper Block R in FIG. 3, can optionally also not be carried out until a higher activation threshold is reached. If the various controller blocks R represent a controller intervention in the case of under- or over-steering, for example, only a weak controller intervention will be carried out for a relatively small value of the criticality indicator $I_K$, whereas, for a higher value of the criticality indicator $I_K$, a strong controller intervention takes place.

Figure 4:
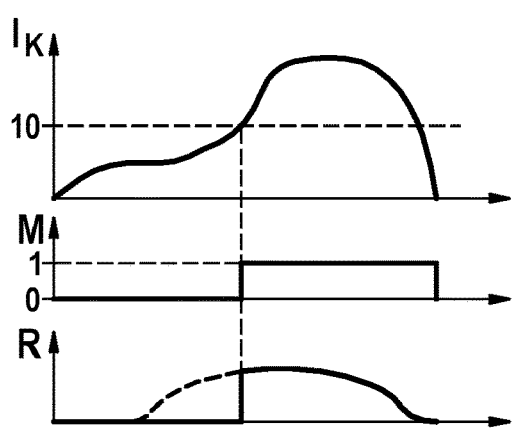
FIG. 4 shows diagrams showing the activation of a controller as a function of the criticality indicator, according to an example embodiment of the present invention.

FIG. 4 shows three superimposed diagrams, wherein the uppermost diagram shows an example of the progression of the criticality indicator $I_K$, the diagram below that shows the value of a multiplier M and the lowermost diagram shows the progression of the controller intervention without and with a multiplier. The criticality indicator $I_K$ is initially below the activation threshold value, which is 10% as an example, wherein, below this threshold value, the multiplier M assumes the value 0. As soon as the criticality indicator $I_K$ exceeds the threshold value, the multiplier M is set to the value 1. The controller intervention of the controller R begins as soon as the multiplier M assumes the value 1, which is shown in the lowermost diagram with the solid line of the controller intervention. In the value range with the multiplier M equal to 0, on the other hand, the potential controller intervention is shown with the dashed line.

Figure 5:
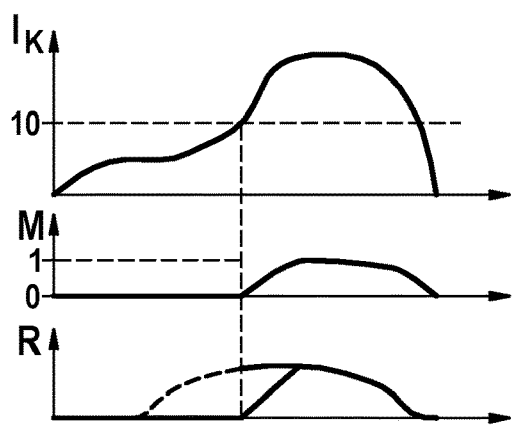
FIG. 5 shows diagrams corresponding to FIG. 4, but with a different controller progression, according to an example embodiment of the present invention.

FIG. 5 shows the same diagrams as in FIG. 4, with the progression of the criticality indicator $I_K$ in the uppermost diagram, the progression of the multiplier M in the middle diagram and the progression of the controller intervention of the controller R in the lowermost diagram. In order to implement a phasing in or phasing out of the controller intervention, however, the multiplier M is not set to the value 1 as soon as the criticality indicator $I_K$ exceeds the activation threshold value, but rather approximately follows the curve progression of the criticality indicator $I_K$ and increases maximally to the value 1. The controller intervention of the controller R therefore exhibits a slightly delayed progression.

What is claimed is:

1. A method for carrying out control procedures in a vehicle, the method comprising the following steps:
    determining at least two different stability indicators from current state variables of the vehicle and/or surroundings variables of the vehicle, wherein a first subset of the current state variables and/or surroundings variables are used for one of the at least two different stability indicators and a second subset of the current state variables and/or surroundings variables are used for another of the at least two different stability indicators, the first and second subsets including different ones of the current state variables and/or surroundings variables;
    calculating a single criticality indicator from the at least two different stability indicators according to a predefined calculation rule; and
    using the single criticality indicator for each of at least two different controllers of the vehicle or at least two different sub-controllers of a controller of the vehicle to:
        implement respective activations of the respective controller or sub-controller conditional on the single criticality indicator exceeding a respective activation threshold value of the single criticality indicator assigned to the respective controller or sub-controller, wherein the respective activation thresholds assigned to different ones of the at least two different controllers or at least two different sub-controllers differ from one another; and
        once the respective controller or sub-controller is activated, continuously adjust intervention strengths of the respective controller or sub-controller in response to changes in the value of the single criticality indicator.

2. The method according to claim 1, wherein the stability indicators include lateral dynamic state variables of the vehicle and longitudinal dynamic state variables of the vehicle.

3. The method according to claim 1, wherein the stability indicators include driver inputs as surroundings variables.

4. The method according to claim 1, wherein the calculation rule for determining the criticality indicator includes carrying out a weighting of the stability indicators.

5. The method according to claim 1, wherein fuzzy logic or artificial intelligence is used in the calculation rule.

6. The method according to claim 1, wherein at least one of the stability indicators is used to limit the criticality indicator.

7. The method according to claim 1, wherein the stability indicators are assigned to different value ranges of the criticality indicator in the calculation rule for determining the criticality indicator.

8. The method according to claim 1, wherein the controllers or sub-controllers using the criticality indicator can be activated simultaneously.

9. A control unit or control unit network comprising at least one processor and at least two different controllers of a vehicle or at least two different sub-controllers of a controller of the vehicle, the at least one processor configured to:
    determine at least two different stability indicators from current state variables of the vehicle and/or surroundings variables of the vehicle, wherein a first subset of the current state variables and/or surroundings variables are used for one of the at least two different stability indicators and a second subset of the current state variables and/or surroundings variables are used for another of the at least two different stability indicators, the first and second subsets including different ones of the current state variables and/or surroundings variables;

calculate a single criticality indicator from the at least two different stability indicators according to a predefined calculation rule; and use the single criticality indicator for each of the at least two different controllers of the vehicle or the at least two different sub-controllers of the controller of the vehicle to:

implement respective activations of the respective controller or sub-controller conditional on the single criticality indicator exceeding a respective activation threshold value of the single criticality indicator assigned to the respective controller or sub-controller, wherein the respective activation thresholds assigned to different ones of the at least two different controllers or at least two different sub-controllers differ from one another; and once the respective controller or sub-controller is activated, continuously adjust intervention strengths of the respective controller or sub-controller in response to changes in the value of the single criticality indicator.

10. A vehicle, comprising:
a control system including:
at least two different controllers or at least two different sub-controllers of a controller;
at least one processor, wherein the at least one processor is configured to:
determine at least two different stability indicators from current state variables of the vehicle and/or surroundings variables of the vehicle, wherein a first subset of the current state variables and/or surroundings variables are used for one of the at least two different stability indicators and a second subset of the current state variables and/or surroundings variables are used for another of the at least two different stability indicators, the first and second subsets including different ones of the current state variables and/or surroundings variables;
calculate a single criticality indicator from the at least two different stability indicators according to a predefined calculation rule; and
use the single criticality indicator for each of at least two different controllers of the vehicle or at least two different sub-controllers of a controller of the vehicle to:
implement respective activations of the respective controller or sub-controller conditional on the single criticality indicator exceeding a respective activation threshold value of the single criticality indicator assigned to the respective controller or sub-controller, wherein the respective activation thresholds assigned to different ones of the at least two different controllers or at least two different sub-controllers differ from one another; and once the respective controller or sub-controller is activated, continuously adjust intervention strengths of the respective controller or sub-controller in response to changes in the value of the single criticality indicator.

11. A non-transitory machine-readable medium on which is stored a computer program including program code for carrying out control procedures in a vehicle, the program code, when executed by a processor, causing the processor to perform the following steps:

determining at least two different stability indicators from current state variables of the vehicle and/or surroundings variables of the vehicle, wherein a first subset of the current state variables and/or surroundings variables are used for one of the at least two different stability indicators and a second subset of the current state variables and/or surroundings variables are used for another of the at least two different stability indicators, the first and second subsets including different ones of the current state variables and/or surroundings variables;

calculating a single criticality indicator from the at least two different stability indicators according to a predefined calculation rule; and using the single criticality indicator for each of at least two different controllers of the vehicle or at least two different sub-controllers of a controller of the vehicle to:

implement respective activations of the respective controller or sub-controller conditional on the single criticality indicator exceeding a respective activation threshold value of the single criticality indicator assigned to the respective controller or sub-controller, wherein the respective activation thresholds assigned to different ones of the at least two different controllers or at least two different sub-controllers differ from one another; and once the respective controller or sub-controller is activated, continuously adjust intervention strengths of the respective controller or sub-controller in response to changes in the value of the single criticality indicator.

* * * * *